United States Patent [19]
Kanao

[11] Patent Number: 5,555,915
[45] Date of Patent: Sep. 17, 1996

[54] CLEANER HOSE

[76] Inventor: Shiro Kanao, 9-18, Nanpeidai 4-chome, Takatsuki-shi, Osaka, Japan

[21] Appl. No.: 411,223

[22] Filed: Mar. 27, 1995

[30] Foreign Application Priority Data

Apr. 1, 1994 [JP] Japan .................................. 6-087507

[51] Int. Cl.⁶ ................................................. F16L 11/11
[52] U.S. Cl. ........................ 138/133; 138/129; 138/122; 174/47; 174/114 R
[58] Field of Search .................................. 138/133, 122, 138/129, 121, 125, 126, 103, 134; 174/47, 113 R, 114 R

[56] References Cited

U.S. PATENT DOCUMENTS

| | | | |
|---|---|---|---|
| 1,951,723 | 3/1934 | Burd et al. | 138/133 X |
| 2,396,059 | 3/1946 | Roberts | 138/122 |
| 2,890,264 | 6/1959 | Duff | 138/133 X |
| 2,914,790 | 12/1959 | Warburton | 138/122 X |
| 2,927,625 | 3/1960 | Rothermel et al. | 138/122 X |
| 2,954,802 | 10/1960 | Duff | 138/133 X |
| 2,961,007 | 11/1960 | Martin | 138/122 |
| 2,998,474 | 8/1961 | Pavlic | 138/133 X |
| 3,169,552 | 2/1965 | Fawick | 138/133 |
| 3,715,458 | 2/1973 | Bayes et al. | 174/113 R |
| 4,098,298 | 7/1978 | Vohrer | 138/133 X |
| 4,167,645 | 9/1979 | Carey | 138/122 X |
| 4,368,214 | 1/1983 | Gillette | 174/114 R |
| 5,416,270 | 5/1995 | Kanao | 138/122 X |

*Primary Examiner*—Patrick Brinson
*Attorney, Agent, or Firm*—Sughrue, Mion, Zinn, Macpeak & Seas

[57] ABSTRACT

A cleaner hose includes a hose body, connection cylinders to be connected to a cleaner operating pipe and a cleaner body, respectively, which are connected to ends of the hose body, respectively, and a reinforcement wire material wound in the hose body spirally and continuously over the whole length of hose body. The reinforcement wire material is shaped like a steeply slanted spiral in a predetermined length portion near one of or both of the ends of the hose body so that adjacent spiral portions of the reinforcement wire material are close to each other while a hose wall of the hose body is loosened toward the inner circumferential surface. On the other hand, the reinforcement wire material is shaped like a gently slanted spiral in an intermediate portion except the one of or both of the ends of the hose body so that adjacent spiral portions of the reinforcement wire material are separated from each other in the direction of a pipe axis.

4 Claims, 6 Drawing Sheets

CLEANER HOSE

BACKGROUND OF THE INVENTION

The present invention relates to a cleaner hose for use in an electric vacuum cleaner and for sucking dust and, more particularly, relates to a cleaner hose having a reinforcement wire material wound spirally in the inside of a hose body to maintain the strength of the hose.

This type of cleaner hose has a commonly known structure in which a hose body is formed in a manner so that a pair of coated wires each of which is prepared by coating a hard steel wire as a reinforcement wire material with a resin or each of which is prepared by integrally coating a hard steel wire and a conductive wire for current conduction with a resin, are wound spirally and a hose wall is fitted and stuck onto the outer circumferential surface of the pair of coated wires, and then a connection cylinder to be connected to a cleaner operating pipe is attached to one end of the hose body and a connection cylinder to be connected to a cleaner body is attached to the other end of the hose body. The reinforcement wire is used to keep the shape of the hose body, and the conductive wire is used for electrical connection of a hand switch for turning ON/OFF an electric source of the cleaner body. Alternatively, there is generally known a cleaner hose having a structure in which the hose body is formed into a double layer composed of inner and outer layers and a coated wire is put between the two layers.

As is known generally, in both the former and latter conventional cleaner hoses, the cleaner hose is shaped like a gently slanted spiral over the whole length of the hose so that adjacent spiral portions of the coated wire are separated uniformly from each other.

Because this type of cleaner hose is used while the cleaner body is pulled in a state such that an unnatural angle is always created between the cleaner operating pipe and the cleaner body according to the movement of the cleaner operating pipe during the usage, an angling operation and a tensile force in a bending direction are applied locally concentratedly to portions of the cleaner hose which are near the connection cylinder to be connected to the cleaner operating pipe and the connection cylinder to be connected to the cleaner body.

Accordingly, the conventional cleaner hose has a problem in that the wall of the cleaner body is locally broken and damaged easily in portions near the connection cylinders respectively at the opposite ends of the cleaner hose.

Further, when an attaching plug cord is stretched fully, the conventional cleaner hose is attended with such a troublesome problem that the plug cord must be put into another plug socket at another place near thereto in order to continue cleaning in the case where an area remains to be cleaned even if the area is a small one.

SUMMARY OF THE INVENTION

It is therefore an object of the present invention to solve the aforementioned problems in the conventional cleaner hose to thereby provide a cleaner hose in which the wiring structure of a bare wire or a coated wire of a hard steel wire or a coated wire prepared by integrally coating a hard steel wire and a conductive wire with a resin is made as a special structure so that a hose body is prevented from being damaged locally and is designed for long-term use and rough handling. Further an attaching plug cord need not be plugged into another plug socket when a small area remains to be cleaned, and an operating pipe can be moved left and right easily in use, so that the cleaner hose structure is user friendly to reduce the amount of user fatigue when cleaning.

The cleaner hose according to the present invention is configured such that a connection cylinder to be connected to a cleaner operating pipe is attached to one end of a hose body and a connection cylinder to be connected to a cleaner body is attached to the other end of the hose body, and a bare wire of a metal reinforcement wire material for maintaining strength, a coated wire prepared by coating such a bare wire with a coating resin, or a coated wire prepared by coating the reinforcement wire material and a current conduction electric wire with the coating resin, is wound spirally and continuously over the whole length of the hose body, wherein the reinforcement wire material is shaped like a steeply slanted spiral in a predetermined length portion at the one of or both of the ends of the hose body adjacent to the connection cylinders so that adjacent spiral portions of the reinforcement wire material are close to each other while a hose wall is loosened toward the inner circumferential surface of the hose, and wherein the reinforcement wire material is shaped like a gently slanted spiral in an intermediate portion except the predetermined length portion so that adjacent spiral portions of the reinforcement wire material are separated from each other in the direction of a hose axis.

With respect to the coated wire prepared by coating the reinforcement wire material and the conductive wire with a resin, any structure such as a structure in which the reinforcement wire material and the conductive wire are arranged side by side in the direction of the axis of the hose wall, a structure in which the reinforcement wire material and the conductive wire are arranged in the direction of the circumference of the hose wall, a structure in which the conductive wire is arranged on the outer circumference of the reinforcement wire material, etc. may be used in the present invention. Further, the coated wire material is not limited to that which is obtained by coating one reinforcement wire material and one conductive wire in combination. For example, the coated wire material may be provided such that one reinforcement wire material and two conductive wires in combination are coated.

Further, the hose wall constituting the hose body in the present invention may be provided as a one-layer wall or as a double-layer wall. The double-layer wall may be carried out such that a bare wire or a coated wire material is disposed between the two layers, a reinforcement cord is further disposed between the two layers, or two layers are formed on the outer circumference of the coated wire material so that a reinforcement cord is disposed between the two layers.

Because the present invention is configured as described above, the steeply slanted portion (extension/contraction zone) of the reinforcement wire material formed near the operating pipe and the steeply slanted portion (extension/contraction zone) of the reinforcement wire material formed near the cleaner body can be bent freely in all directions with less resistance during the usage of the cleaner, and the angles with respect to the portion can be changed flexibly. Further, these extension/contraction zones can be extended in the direction of the hose axis by pulling the hose.

Accordingly, when the cleaner hose according to the present invention is attached to the cleaner and is used, the cleaner hose can be used while resulting in little user fatigue because these extension/contraction zones are bent freely with less resistance, and further the cleaner hose can be fit

DETAILED DESCRIPTION OF THE PREFERRED EMBODIMENTS

Preferred embodiments of the present invention will be described below with reference to the drawings.

Figure 1:
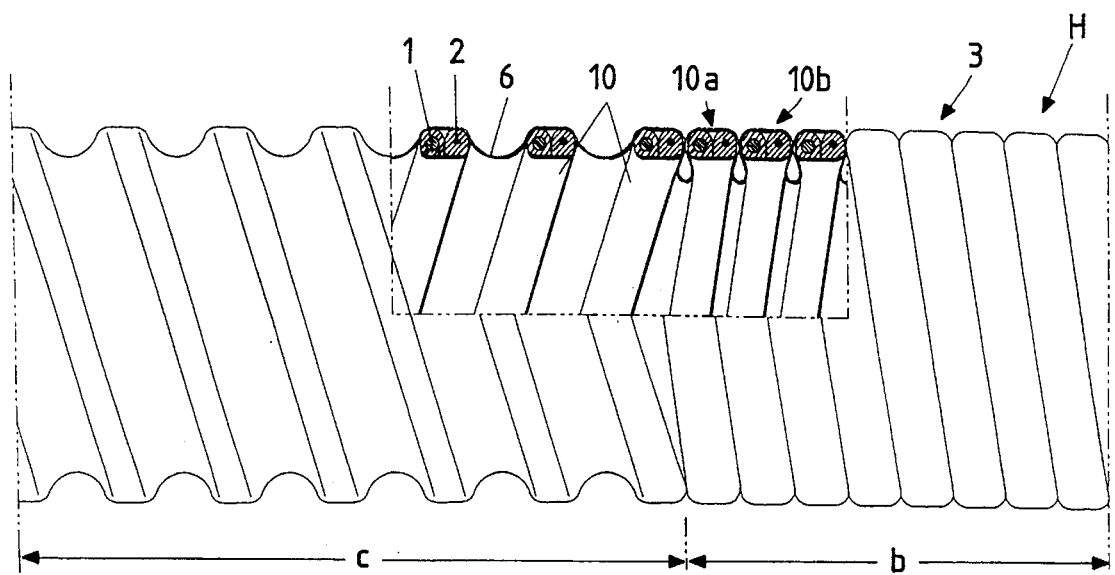
FIG. 1 is a partly cutaway external appearance view of a hose according to a first embodiment of the present invention.
Figure 2:
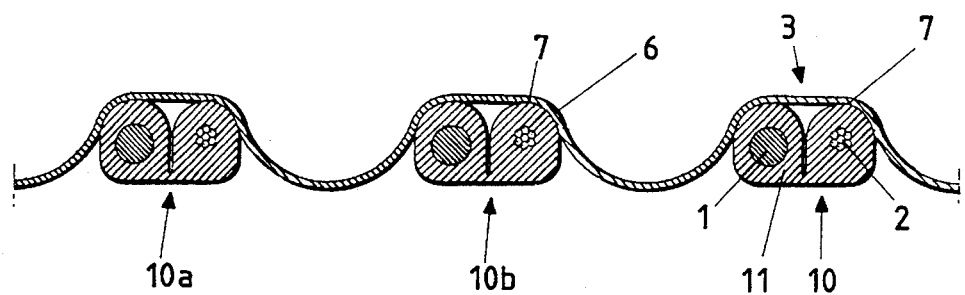
FIG. 2 is an enlarged sectional view of an intermediate portion of a pipe wall of the hose of FIG. 1.
Figure 3:
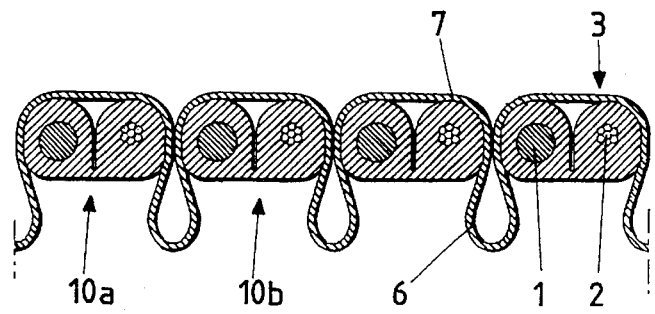
FIG. 3 is an enlarged sectional view of an end portion of the pipe wall of the hose of FIG. 1.
Figure 4:
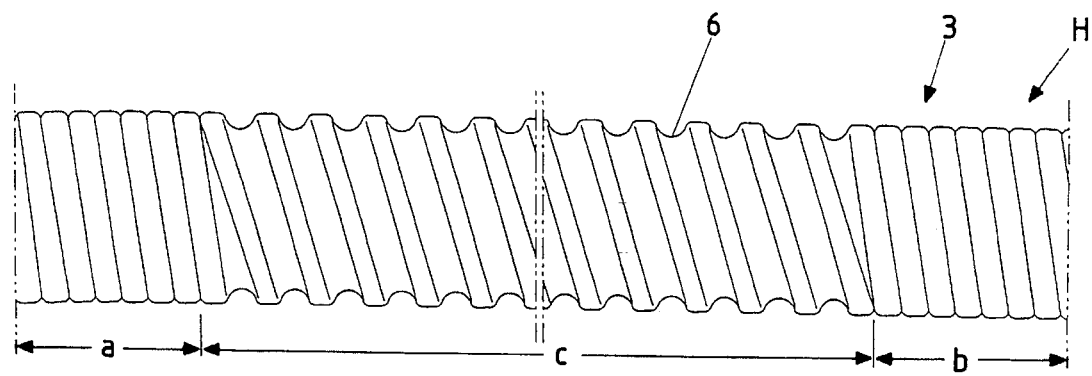
FIG. 4 is an external appearance view of a hose body of the hose of FIG. 1 in which an intermediate portion is omitted.

FIGS. 1 to 4 are views showing a first embodiment of the present invention. FIG. 1 is a partly cutaway view showing the external appearance of main parts of a cleaner hose H, FIGS. 2 and 3 are enlarged views showing the structure of a pipe wall portion, and FIG. 4 is a view showing the overall shape of a hose body in which a part of an intermediate portion of the hose body is omitted.

A coated wire 10 shown in this embodiment is prepared in such a manner that a reinforcement wire material 1 made of a hard steel wire having a diameter of about 1 mm and a conductive wire 2 obtained by intertwisting a large number of copper fine wires are respectively coated with polyvinyl chloride resin 11 in the shape of an arc while the resin is partially connected between the reinforcement wire material 1 and the conductive wire 2 so as to be shaped like eyeglasses in section.

In this embodiment, the hose H is provided in which: a hose body 3 is formed by winding a pair of coated wires 10, 10 spirally at a double pitch, applying an adhesive agent 7 only to the upper surface of the coating resin 11 of the conductive wire 2 in each of the coated wires, winding a belt-like material made of polyvinyl chloride to form a hose wall 6 on the outer circumference thereof, and connecting adjacent portions of the belt-like material to each other while laying one portion of the belt-like material upon another partially; the coated wires 10 are shaped like a steeply slanted spiral in predetermined length portions a and b at opposite ends of the hose body 3 so that adjacent spiral portions of the coated wires 10 are close to each other while the hose wall 6 is folded and loosened toward the inner circumference side in the form of a loop in section; and the coated wires 10 are shaped like a gently slanted spiral in an intermediate portion c except those opposite end portions a and b so that adjacent spiral portions of the coated wires 10 are separated from each other in the longitudinal direction of the hose in a normal state. That is, as shown in FIG. 4, the extension/contraction zones a and b are formed in the opposite end portions of the hose body 3 so that adjacent portions of the hose wall 6 are close to each other, whereas the general zone c is formed in the intermediate portion of the hose body 3 so that the adjacent portions of the hose wall 6 are separated from each other.

Figure 5:
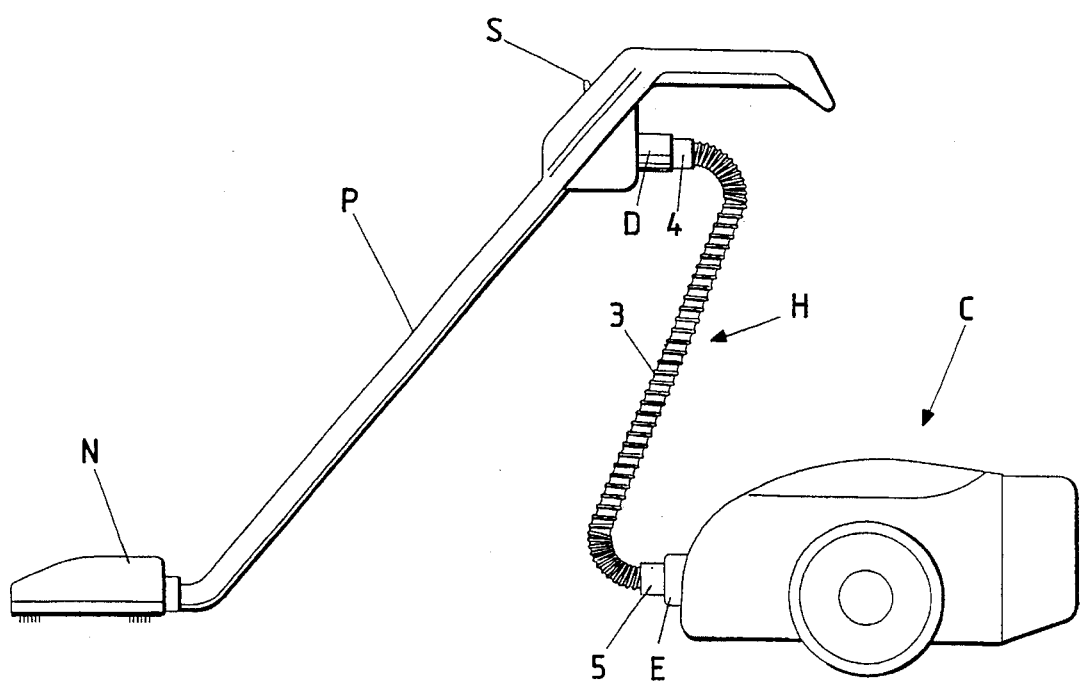
FIG. 5 is a side view showing the state of use of the hose of FIG. 1.

With respect to the hose body 3 with the aforementioned structure, as shown in FIG. 5, not only a connection cylinder 4 for connecting the hose body 3 to a cleaner operating pipe P is attached to the one end of the hose body 3 and fixed thereto by an adhesive agent but also another connection cylinder 5 for connecting the hose body 3 to a cleaner body C is attached to the other end of the hose body 3 and fixed thereto by an adhesive agent, and, at the same time, not only the reinforcement wire material 1 made of the hard steel wire is connected to an electric source ON/OFF operating connector for the cleaner body C but also the conductive wire 2 is connected to a power connector connected to a rotary brush motor built in a nozzle head N at a forward end of the cleaner operating pipe P.

As shown in FIG. 5, after the hose H is connected between the cleaner operating pipe P and the cleaner body C by inserting the connection cylinder 4 at the one end of the hose H into an air-intake cylinder D of the cleaner operating pipe P and inserting the connection cylinder 5 at the other end of the hose H into a suction cylinder E of the cleaner body C, the cleaner is used through ON/OFF operation of a switch S.

Figure 6:
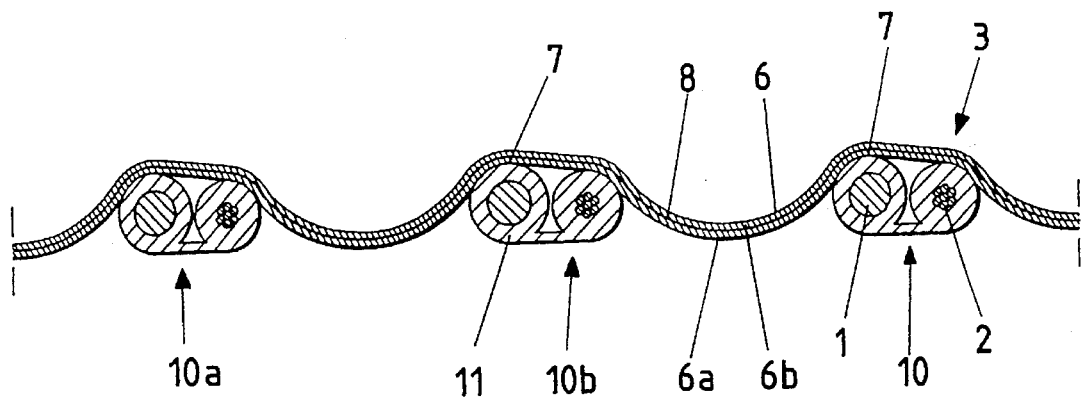
FIG. 6 is an enlarged sectional view of a portion corresponding to FIG. 2, showing a second embodiment.
Figure 7:
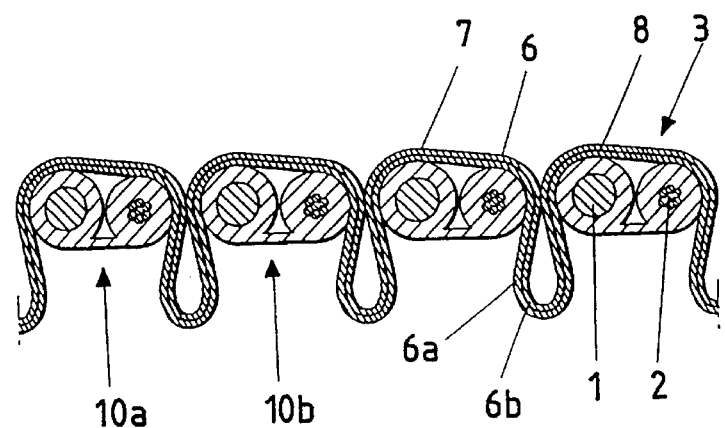
FIG. 7 is an enlarged sectional view of a portion corresponding to FIG. 3, showing the second embodiment.

In a second embodiment shown in FIGS. 6 and 7, the hose body 3 has such structure wherein the hose wall 6 is made of a double-layer wall constituted by an inner layer 6a and an outer layer 6b, and a large number of reinforcement threads 8 are buried between the inner and outer layers 6a and 6b so as to be arranged at an interval of a suitable distance in the direction of the circumference of the hose along the direction of the length of the hose.. Further, the hose wall 6 and the coated wire 10 are stuck to each other by applying an adhesive agent 7 onto the coating resin portion of the reinforcement wire material 1.

The hose wall 6 in the present invention may be a double-layer wall as described above. The reinforcement threads 8 interposed between the layers may be shaped like a net. The threads thus interposed may be replaced by metal fine wires or other reinforcement materials.

The rough sizes of respective portions in the drawings showing the embodiment will be described below so that the size of the hose H in the embodiment can be grasped easily. The reinforcement wire material 1 has a diameter of 1.0 mm. The coating portion of the reinforcement wire material 1 has a diameter of 2.35 mm. The number of the conductive wires 2 each having a diameter of 0.18 mm is 7. The diameter of the coating portion of the conductive wires 2 is 1.5 mm. The thickness of the portion connecting the two coating portions is 0.5 mm. The distance between the center line of the reinforcement wire material 1 and the center line of the conductive wires 2 is 2.0 mm. The distance between the center lines of adjacent spiral portions of the reinforcement wire material 1 in FIG. 6 is 10.0 mm. The average thickness of the inner layer 6a of the hose wall 6 is 0.35 mm. The average thickness of the outer layer 6b of the hose wall 6 is 0.25 mm. The inner diameter of the hose body 3 is 37.5 mm. The outer diameter of the hose body 3 is 44.0 mm.

FIGS. 8 through 14, which will be described below, are views of a portion equivalent to FIG. 3, showing third to ninth embodiments, respectively.

Figure 8:
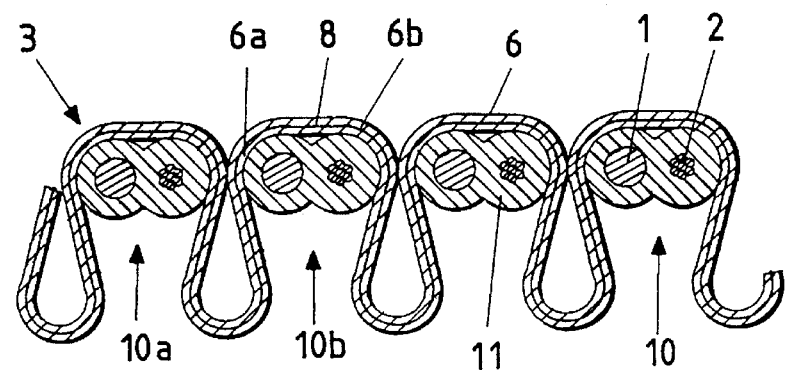
FIGS. 8 to 14 are enlarged sectional views of a portion corresponding to FIG. 3, showing third to ninth embodiments, respectively.

The third embodiment shown in FIG. 8 has such structure that the coated wire 10 is made to have a shape like a "figure 8" in section; the hose wall 6 is made of a double-layer wall; and reinforcement threads 8 are interposed between the two layers of the hose wall 6.

Figure 9:
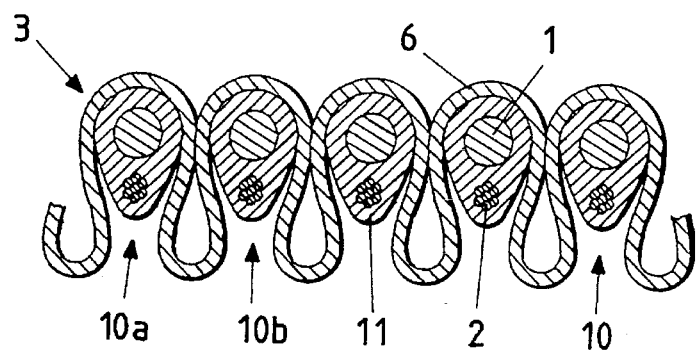

The fourth embodiment shown in FIG. 9 has such structure that the coated wire 10 is made to have a shape like an egg in section; and the side at which the steel wire 1 is buried is located at the outer circumference side so that the hose wall 6 is stuck to the outer circumference of the coating resin 11 at the side of the steel wire 1.

Figure 10:
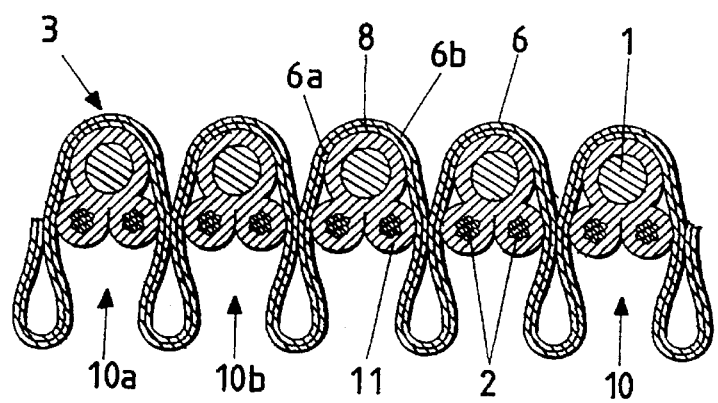

In the fifth embodiment shown in FIG. 10, the coated wire 10 is obtained by coating one steel wire 1 as a reinforcement wire material and two conductive wires 2, 2 in combination. In this embodiment, the coated wire 10 is formed by arranging the steel wire 1 in the center and the conductive wires 2, 2 laterally symmetrically in the lower side of the steel wire 1 and integrally coating the steel wire 1 and the conductive wires 2, 2 with a coating resin 11. This embodiment has such a structure that not only the outer circumference of the coating resin 11 at the side of the steel wire 1 is stuck to the hose wall 6 in the same manner as described above in the embodiment of FIG. 9, but also the lateral outer sides of the conductive wires 2, 2 are partially stuck to the hose wall 6.

Figure 11:
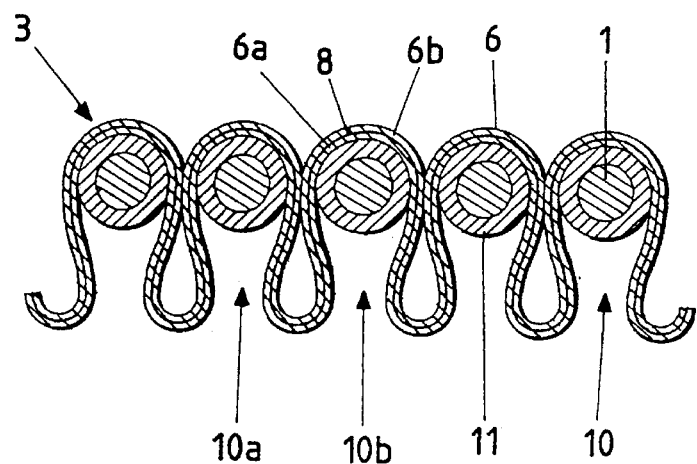
Figure 12:
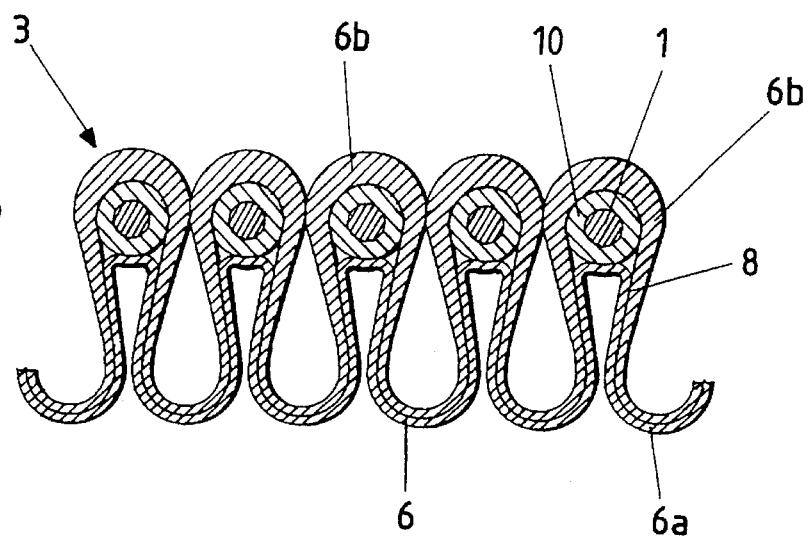

Although the aforementioned embodiments have shown the case where the coated wire 10 is prepared by integrally coating the reinforcement wire material 1 and the conductive wire(s) 2, the following embodiments of FIGS. 11 and 12 show the case where only the metallic reinforcement wire material 1 with no buried conductive wire 2 is coated so that the metallic reinforcement wire material 1 is used as a signal line.

The sixth embodiment shown in FIG. 11 has such structure that the hard steel wire 1 is coated with a resin so as to have a shape like a circle in section; and the hose wall 6 constituted by two walls 6a and 6b is provided at the outer circumference side of the coated hard steel wire.

Further, the seventh embodiment shown in FIG. 12 has such structure that the coated wire 10 shaped like a circle in section in the same manner as described above is disposed between the inner and outer walls 6a and 6b of the hose wall 6; and reinforcement threads 8 are interposed between the inner and outer walls 6a and 6b and between the outer wall 6b and the outer circumference of the coated wire 10. Further, the outer wall 6b is formed to have a change in its thickness so that the thick portion of the outer wall 6b is disposed at the outer circumference side of the coated wire 10.

Figure 13:
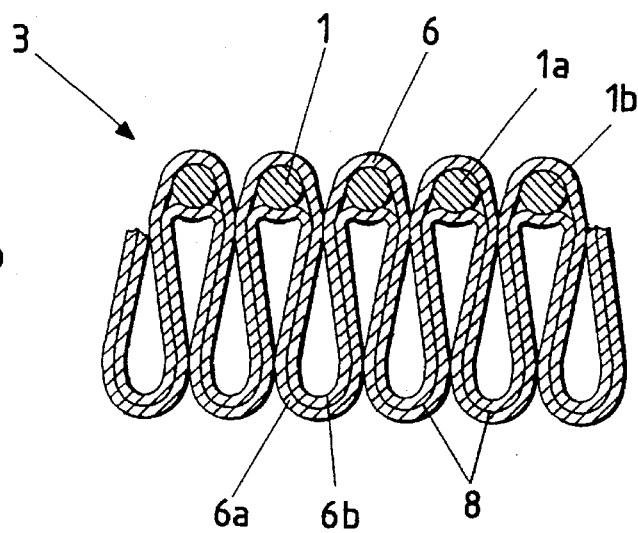
Figure 14:
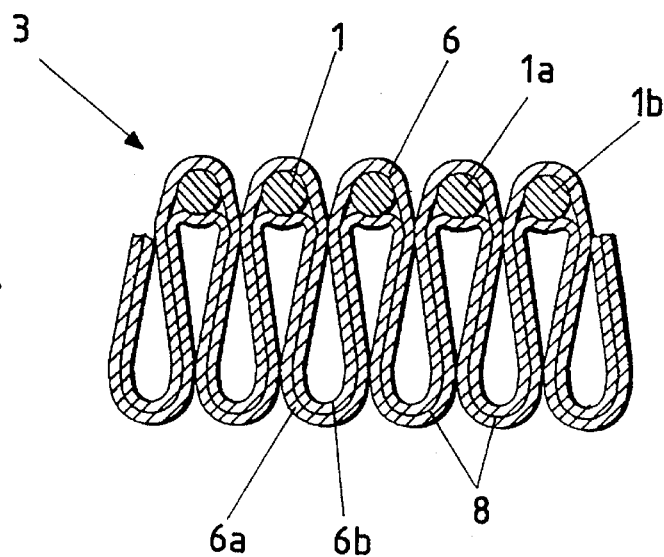

Although the aforementioned embodiments have shown cases of the coated wire 10 prepared by coating the reinforcement wire material 1 with a coating resin, the following embodiments of FIGS. 13 and 14 have such structure that only the metallic reinforcement wire material 1 is used without any conductive wire 2 and without any coating resin so that the metallic reinforcement wire material 1 is arranged to be interposed between pipe walls 6a and 6b provided as inner and outer layers in the same manner as described above in the embodiment shown in FIG. 12.

The eighth embodiment shown in FIG. 13 has such structure that the hard steel wire 1 is interposed between the inner and outer walls 6a and 6b of the hose wall 6; and reinforcement threads 8 are interposed between the inner and outer walls 6a and 6b and between the outer wall 6b and the outer circumference of the hard steel wire 1.

The ninth embodiment shown in FIG. 14 is similar to the eighth embodiment except that reinforcement threads 8 are interposed between the inner wall 6a and the hard steel wire 1.

Figure 15:
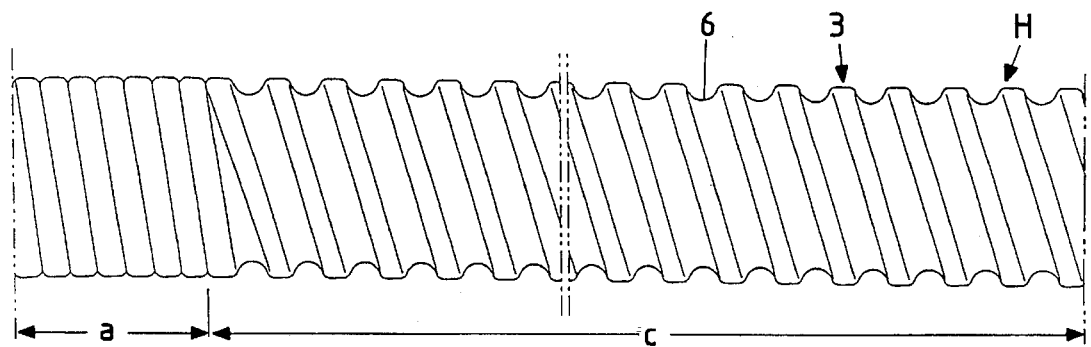
FIG. 15 is an external appearance view of a hose body of a hose according to a tenth embodiment.
Figure 16:
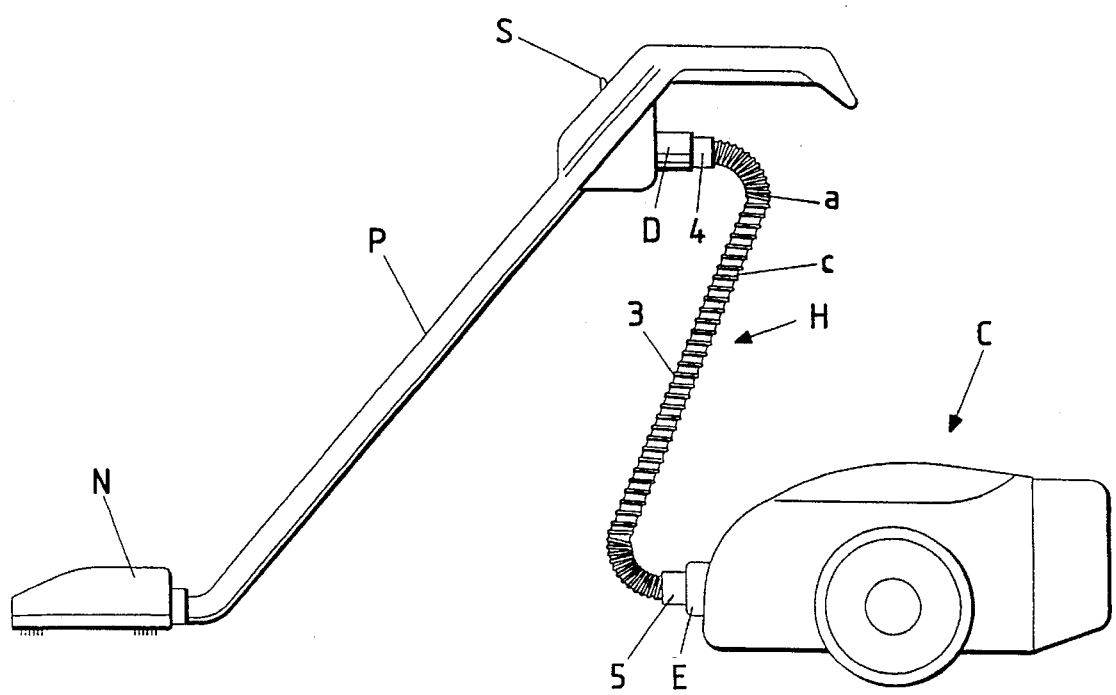
FIG. 16 is a side view of the state of use of the hose according to the tenth embodiment.

The hose H of the tenth embodiment as shown in FIGS. 15 and 16 has such structure that only a predetermined length portion a at one end of the coated wire is an extension/contraction zone of steeply slanted spiral in which adjacent spiral portions of the covered wire 10 are close to each other while the hose wall 6 is foled and loosened toward the inner circumference side in the form of a loop in section, and the other portion c is a general zone of a normal state in which the hose wall is stretched.

With respect to the hose body 3 with such structure, in the same manner as described in FIG. 5, the connection cylinder 4 for connecting the hose body 3 to the cleaner operating pipe P is attached to the one end of the hose body at the extension/contraction zone a and another connection cylinder 5 for connecting the hose body 3 to the cleaner body C is attached to the other end of the hose body at the side of the general zone c, and at the same time, the reinforcement wire material and conductive wire in the inside of the hose wall 6 are respectively connected to desired connectors in the connection cylinders 4 and 5.

As shown in FIG. 16, the connection cylinder 4 at the side of the extension/contraction zone c is inserted into the air-intake cylinder D of the cleaner operating pipe P and the connection cylinder 5 at the side of the general zone c is inserted into the suction cylinder E of the cleaner body C. Then, the cleaner is used through ON/OFF operation of the switch S. The structure of the coated wire and the hose wall in the tenth embodiment may have any one in the first to ninth embodiments.

Although the embodiments of the present invention, which are considered to be typical, have been described, it is to be understood that the present invention is not always limited to the structures of these embodiments but it can be suitably changed or modified so long as the modifications have the aforementioned constituent features of the present invention, achieve the object of the present invention and have the following effects.

As is clear from the above description, the present invention has the structure in which: the reinforcement wire in the hose body is shaped like a steeply slanted spiral in a predetermined length portion adjacent to one or both of the connection cylinders attached to the ends of the hose body so that adjacent spiral portions of the reinforcement wire are close to each other while the hose wall is loosened toward the inner circumference side; and the reinforcement wire is shaped like a gently slanted spiral in an intermediate portion except the above predetermined length portions so that adjacent spiral portions of the reinforcement wire are separated from each other in the direction of the hose axis. In the usage of the cleaner, either the steeply slanted portion of the reinforcement wire formed near the cleaner operating pipe or the steeply slanted portion of the reinforcement wire formed near the cleaner body or both the steeply slanted portions can be bent freely in all directions with less resistance so that the angles can be changed flexibly. Accordingly, there is no locally concentrated stress acting on these free extension/contraction portions, so that it is possible to expect such a remarkable effect that the cleaner hose is designed for long-term use with less local damage.

Further, because the free extension/contraction portions can be bent freely with less resistance when the cleaner hose according to the present invention is attached to the cleaner and is used, the cleaner hose can be used so as to make the user less tired. Further, because these free extension/contraction portions can be extended in the direction of the hose axis by pulling the hose when a small area remains to be cleaned, there can be expected such an effect that cleaning can also be performed conveniently in this case without the necessity of changing the plug socket.

What is claimed is:

1. A cleaner hose, comprising:

an elongated hose body including a reinforcement wire material and a hose wall, said reinforcement wire material being wound spirally and continuously over a whole length of said hose body, said hose body including a first end portion and a second end portion;

a first connection cylinder operative for connection to a cleaner operating pipe, said first connection cylinder being attached to said first end portion of said hose body; and a second connection cylinder operative for attachment to a cleaner body, said second connection cylinder being attached to said second end portion of said hose body;

wherein said reinforcement wire material is shaped like a steeply slanted spiral in a portion of said hose body near at least one of said first end portion and said second end portion of said hose body so that first adjacent spiral portions of said reinforcement wire material are close to each other while said hose wall is loosened toward an inner circumferential surface of said hose body; and wherein said reinforcement wire material is shaped like a gently slanted spiral in an intermediate portion of said hose body except said at least one of said first end portion and said second end portion of said hose body so that second adjacent spiral portions of said reinforcement wire material are separated from each other in an axial direction of said hose body, said cleaner hose further comprising:

a conductive wire; and a resin layer covering said reinforcement wire material and said conductive wire, said conductive wire being disposed adjacent to and parallel to said reinforcement wire material with an interval between said conductive wire and said reinforcement wire material, said resin layer having a recessed thin portion at a position between said reinforcement wire material and said conductive wire so that said reinforcement wire material and said conductive wire covered with said resin layer are easily separated from each other.

2. A cleaner hose according to claim 1, wherein said reinforcement wire material is a metal wire.

3. A cleaner hose according to claim 1, wherein said portion of said hose body in which said reinforcement wire material is shaped like said steeply slanted sprial, is positioned near said first end portion of said hose body to which said first connection cylinder to be connected to said cleaner operating pipe is attached.

4. A cleaner hose according to claim 1, wherein said hose wall is formed of an inner layer and an outer layer.

* * * * *

UNITED STATES PATENT AND TRADEMARK OFFICE
CERTIFICATE OF CORRECTION

Page 1 of 2

PATENT NO. : 5,555,915
DATED : September 17, 1996
INVENTOR(S) : Shiro Kanao

It is certified that error appears in the above-indentified patent and that said Letters Patent is hereby corrected as shown below:

In the drawings, Sheet 6 of 6, Fig. 16, there should only be one extension/contraction zone "a" at the upper end of the hose H. Accordingly, Fig. 16 should appear as per attaches page.

Signed and Sealed this

Eighth Day of April, 1997

Attest:

BRUCE LEHMAN

Attesting Officer

Commissioner of Patents and Trademarks

UNITED STATES PATENT AND TRADEMARK OFFICE
CERTIFICATE OF CORRECTION

Page 2 of 2

PATENT NO. : 5,555,915
DATED : September 17, 1996
INVENTOR(S) : Shior Kanao

It is certified that error appears in the above-indentified patent and that said Letters Patent is hereby corrected as shown below:

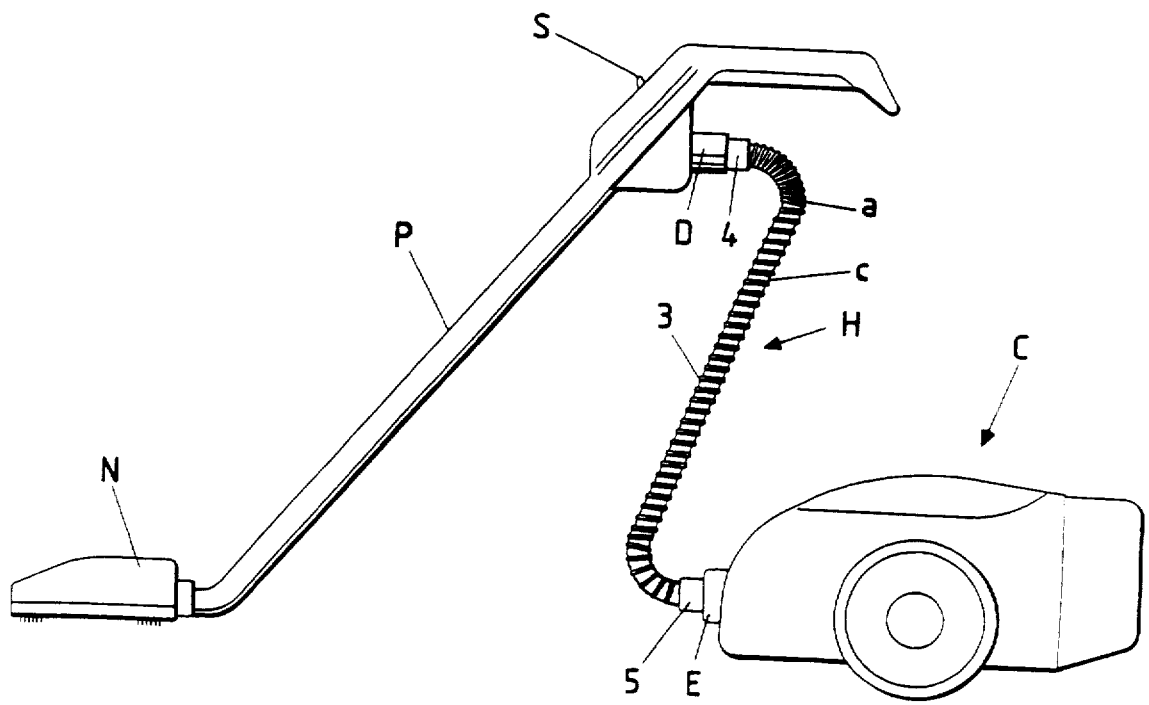

FIG. 16